March 19, 1946.     I. L. WOLK ET AL     2,396,907
PRODUCTION OF SYNTHETIC RUBBER
Filed Dec. 14, 1942
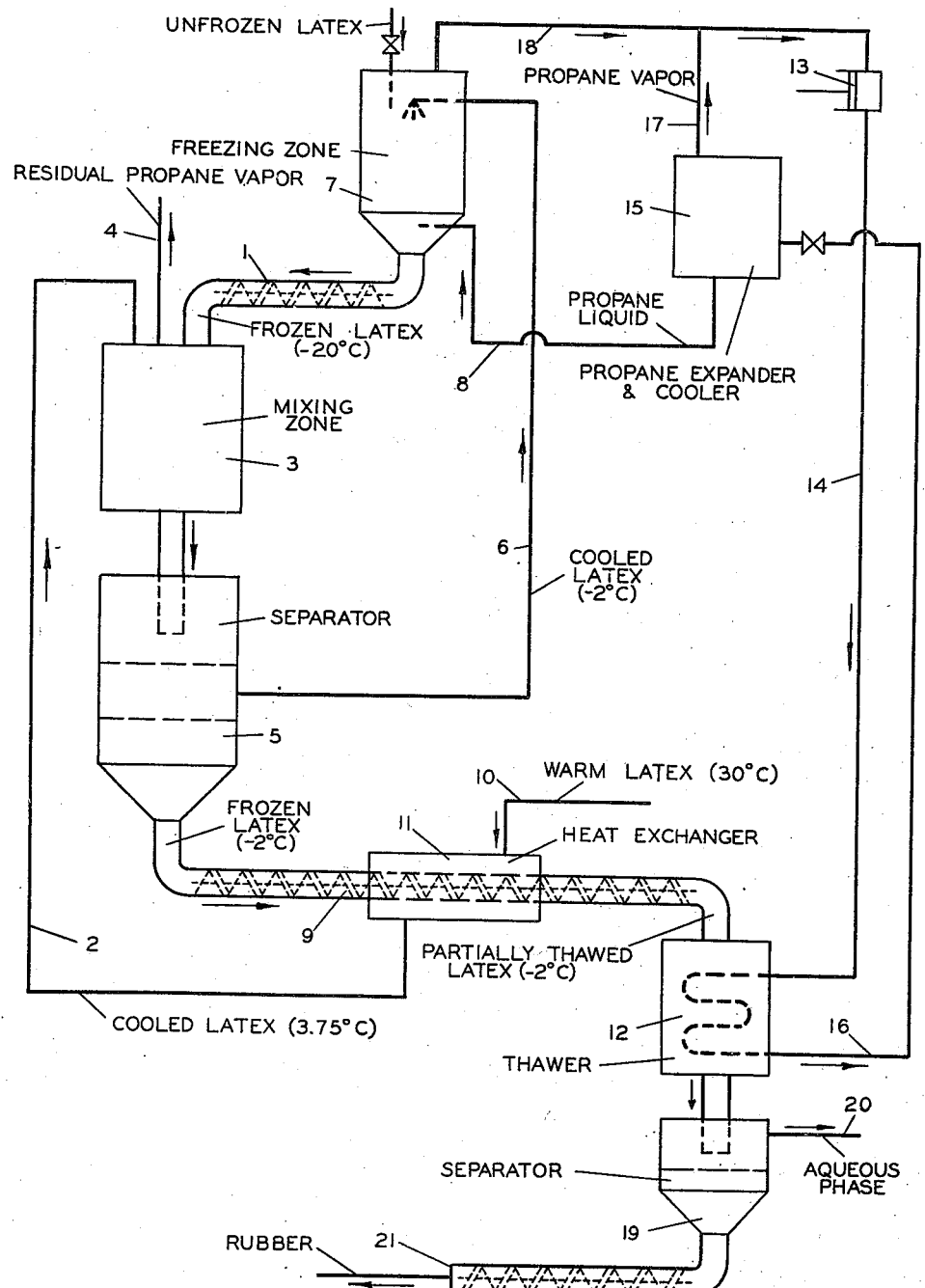
INVENTORS
I. L. WOLK
J. D. UPHAM
BY Hudson, Younger Yinger
ATTORNEYS Patented Mar. 19, 1946

2,396,907

UNITED STATES PATENT OFFICE 2,396,907

PRODUCTION OF SYNTHETIC RUBBER

I. Louis Wolk and John D. Upham, Bartlesville, Okla., assignors to Phillips Petroleum Company, a corporation of Delaware Application December 14, 1942, Serial No. 468,958

9 Claims. (Cl. 260—86.5)

This invention relates to the production of synthetic rubber by the latex emulsion polymerization method. More particularly it relates to the recovery of the rubber from the latex by coagulation of the emulsion by an improved freezing process.

In the copending application of I. Louis Wolk, Serial No. 468,957, filed Dec. 14, 1942, there is disclosed an improved method of coagulating synthetic rubber latex by freezing by commingling the latex intimately with a liquid refrigerant such as propane. In such a process it is desirable to use heat exchange expedients in order to utilize the refrigeration as efficiently as possible. Ordinarily indirect heat exchange methods would be used, and if perfect exchange were possible, and no heat entered the cold parts of the system from extraneous sources, the net refrigeration required would be only that necessary to cool the latex from the polymerizing temperature at which it is available down to room temperature. Of course, such perfect exchange is not attainable in actual practice, but we have discovered a method of accomplishing coagulation of the latex by freezing in a very economical manner by an improved method involving heat exchange.

The principal object of the present invention is to provide an improved process of coagulating synthetic rubber latex by freezing. Another object is to provide such a method employing an improved heat exchange. Another object is to provide such a method wherein a direct heat exchange step is used to effect a substantial part of the total heat exchange employed in the step of coagulating by freezing, the balance being advantageously effected by indirect heat exchange. Numerous other objects will hereinafter appear.

The accompanying drawing portrays diagrammatically one arrangement of apparatus that may be advantageously employed in carrying out the present invention in one embodiment. While the modification illustrated is essentially a continuous process, the principles of the invention may be readily adapted to batchwise operation by those skilled in the art.

In accordance with the present invention the synthetic rubber latex, i. e., the emulsion of polymer derived from the polymerizer, is frozen in any suitable manner. The frozen latex is placed in a suitable vessel or zone and intimately and directly admixed or contacted with relatively warm unfrozen latex, especially latex coming from the polymerizer with or without an intermediate cooling step. The warm unfrozen latex and the frozen latex are intimately admixed with each other in order to bring about thermal equilibrium.

Preferably the temperature of the liquid latex so admixed with the frozen latex, the temperature of the frozen latex, and the relative proportions of unfrozen and frozen latex admixed in the mixing zone are so adjusted prior to entry into the zone that, after thermal equilibrium has been established, the resulting mixture is at the freezing point and comprises substantial proportions of each of the frozen and melted phases.

In a continuous operation such as that portrayed in the drawing, it is especially preferred to feed equal proportions by weight of the frozen and unfrozen latex to the mixing zone and to so adjust the temperatures of each incoming stream that when thermal equilibrium between the frozen and unfrozen phases is established, one-half of the total mixture by weight is in the liquid state and one-half is in the solid state. In such an operation the liquid phase is continuously withdrawn and frozen in a separate zone to supply the frozen latex fed to the mixing zone. When such thermal equilibrium has been established, the liquid phase comprises predominantly unfrozen latex along with minor amounts of the aqueous phase from thawed latex, while the solid phase will comprise predominantly frozen latex with small quantities of rubber precipitated from thawed latex.

It is preferred that all parts of the apparatus be well insulated against heat because they are for the most part at temperatures substantially below room temperature. This lowers the refrigeration requirements and promotes high thermal efficiency. It is especially important that the mixing zone wherein the unfrozen and the frozen latex streams are admixed be well insulated so that substantially adiabatic conditions prevail therein. Ordinarily no additional cooling by heat exchange with an extraneous coolant takes place in the mixing zone, although such added cooling may be employed if found desirable.

After mixing has been accomplished and thermal equilibrium established, the solids are separated from the liquid phase. The liquid phase which is usually at substantially the freezing temperature is passed to a refrigeration unit where it is frozen to provide the frozen latex introduced to the mixing zone.

The separated solid phase is heated to thaw it, and the precipitated rubber is then separated, washed and passed to further utilization steps.

As a further and advantageous feature of our invention, the thawing of the solid frozen latex separated from the mixture resulting from the mixing step may be at least partially accomplished by passing liquid latex direct from a polymerizer in indirect heat exchange with the solids to be thawed. This makes possible the most effective utilization of the refrigeration, and the warm latex is brought to the proper temperature for its next step of mixing with frozen latex in the mixing or direct heat exchange step described above. Cooling the warm latex in this manner does not complete the thawing of the frozen latex and the partially thawed latex may finally be passed in indirect heat exchange with warm, compressed refrigerant used in the freezing step, to cause further heating or thawing of the frozen latex. Alternatively or in addition, the partially thawed latex may be passed in heat exchange with media used for cooling the polymerizers. In any event a final thawing step may be employed. After thawing, the coagulated rubber is separated from the aqueous phase which may conveniently be recycled to the emulsion forming step wherein the monomer is emulsified prior to passage to the polymerizer.

An important advantage is the rapidity of the heat transfer by direct heat exchange in the mixing zone. It was not to be foreseen that the frozen latex and the unfrozen latex could be directly admixed with one another with satisfactory results, since in ordinary processes it is wholly impossible or unfeasible to mix a product stream directly with an incoming stream to secure direct heat exchange. The overall refrigeration requirements are as low as possible since the heat of fusion of the latex is utilized completely. The direct heat exchange step achieves an unusually rapid change in temperature for outgoing frozen latex and incoming liquid latex and reduces the amount of indirect heat exchange required, and in many cases eliminates need for indirect heat exchange. As will be well understood by those skilled in the art, indirect heat exchange is very unsatisfactory since it requires elaborate equipment, the heat transfer is imperfect, and it is impossible to obtain the rapid and perfect thermal equilibrium obtained in the direct heat exchange step of the present invention.

The cycle as thus described is continued indefinitely either batchwise or continuously, new liquid latex being admixed with freshly frozen latex, the solids separated from the liquids, etc.

Heat exchange requirements of prime importance in the thawing of the frozen latex are met by the process described herein. One is that greatest possible use is made of the refrigerating capacity of the frozen latex whereby the overall refrigeration requirements are kept at a minimum. Another is that heat exchange be as efficient as possible so that in a batch process the time required for the various operations be kept short or in a continuous process the equipment be of small size and simple. In accordance with our invention, direct heat exchange is at a maximum while indirect heat exchange between solids and liquids which is especially difficult is at a minimum.

The process is particularly applicable when the freezing step is conducted in accordance with the copending application of Wolk above-identified wherein freezing is accomplished by intimately and directly admixing the liquid latex with a refrigerating gas in liquid state and allowing evaporation of the gas to cause freezing of the latex. This process is especially advantageous for use in the present invention since the resulting frozen latex is of a granular and spongy nature which facilitates rapid and intimate admixture with the liquid latex. As the refrigerant, liquefied petroleum gas, especially liquid propane, is preferred.

Under exceptional circumstances, though ordinarily less preferably, operation may be so conducted that all of the relatively warm or unfrozen latex is frozen in the mixing zone by the frozen latex, the latter being at a temperature sufficiently below the freezing point and being introduced in quantity sufficient to effect freezing of the entire amount of the warm latex.

At the other extreme, and likewise less preferably, the mixing step is so conducted that all of the frozen latex is melted therein by the unfrozen latex, whereby the solid phase consists only of coagulated rubber. Such operation is normally undesirable because of the diluting effect of the aqueous phase derived by the thawing of the frozen latex.

Referring now to the accompanying drawing, frozen latex, say at —20° C., is fed via line 1 into mixing zone 3 wherein it is admixed with relatively warm unfrozen latex, say at 3.75° C., fed via line 2. Any residual refrigerant may leave vessel 3 in vapor form via line 4. After attaining equilibrium, the resulting mixture of solid and liquid which is at the freezing point, say —2° C., is passed to separator 5 where separation of solid and liquid phases takes place. The cooled latex which is at the freezing point, say —2° C., is passed via line 6 to the freezing zone 7 where liquid propane introduced via line 8 is intimately contacted with it to freeze it, the frozen latex being removed from freezer 7 by line 1 equipped with a screw conveyor.

The solid phase separated in zone 5 is removed via line 9 also equipped with a conveyor screw. This solid phase is also at the freezing point, say —2° C. and comprises frozen latex as well as any solid rubber coagulated by any thawing of frozen latex in the mixing step.

The solid phase in line 9 passes in indirect heat exchange with relatively warm (say at 30° C.) fresh latex entering the system via line 10. This is done in heat exchanger 11, the latex thereby cooled to say 3.75° C. leaving via line 2 and thence entering mixer 3.

The thereby partially thawed latex, still at the freezing point, say —2° C., passes thence to thawer 12 where it comes into indirect (or if desired, direct) heat exchange with warm propane passing from refrigerant compressor via line 14 and returning to an expander and cooler 15 via line 16. The cold liquid propane leaves 15 via line 8 and passes into freezer 7. The propane gas formed in 15 leaves via line 17, joins propane gas leaving freezer 7 via line 18 for passage to compressor 13.

The thawed latex passes from thawing zone 12 to separation vessel 19 where the aqueous phase is removed via line 20 and the rubber coagulum via line 21 equipped with conveyor screw. The aqueous phase is advantageously recycled to that portion of the rubber plant where the emulsion of monomeric unsaturated compounds is prepared.

Although in the drawing the solid phases in separators 5 and 19 are shown as being below the liquid phase, this will not always be the case. Whether the solids float or sink will depend upon the particular type of synthetic rubber latex being treated. The densities of different latices, both unfrozen and frozen, vary considerably as do the densities of the different coagulated synthetic rubbers. The specific gravity of natural rubber is approximately 0.9, while that of various synthetic rubber-like polymers produced by emulsion polymerization ranges from about 0.9 to 1.2 or higher. Of course, the separation of solids from liquids may be accomplished by filtration, centrifuging, or other known methods, as well as by the gravitational settling shown.

The freezing point of the latex will depend upon its composition, particularly as to the concentration of electrolytes and polymer therein. Furthermore, although ideally the final temperature in mixing zone 3 and separator 5 will be equal to the freezing point of the latex being treated, it may in some cases be somewhat higher or lower, especially if it is more economical over all not to wait for attainment of complete thermal equilibrium therein. In such case, the temperatures of the separated latex and solid phases may still be a few degrees apart.

The latexes preferably treated in accordance with our invention are the products of polymerization in aqueous emulsion of an aliphatic conjugated diolefin such as butadiene, isoprene, or substituted or unsubstituted homologs thereof, polymerized either by itself or in conjunction with one or more other unsaturated materials, especially vinyl compounds such as acrylonitrile or styrene. Such polymerization may be accomplished in known manner, for example as described in U. S. Patents 1,938,731 and 1,973,000, or by newer methods or modifications known to the art. The invention may be applied also to other emulsions such as natural rubber latex or the like, but is ordinarily most advantageous in cases wherein it is important to readily recover emulsifying agents and unreacted material as in the case of synthetic rubber emulsions.

We claim:

1. The process of coagulating a synthetic rubber latex consisting of an aqueous dispersion of a copolymer of butadiene and styrene, which comprises freezing said synthetic rubber latex in a freezing zone, admixing the resulting frozen latex with a portion of said synthetic rubber latex in unfrozen condition in a mixing zone, allowing the establishment of thermal equilibrium in the resulting mixture, so adjusting the temperatures and relative proportions of the frozen and unfrozen latex so admixed that said resulting mixture is at the freezing point and contains substantial proportions of both solid and liquid phases, separating the solid phase from the liquid phase, and freezing the liquid phase in said freezing step.

2. The process of claim 1 wherein said solid phase is passed in indirect heat exchange relationship with said portion of unfrozen synthetic rubber latex whereby the latter is cooled on its way to said mixing zone and heat is simultaneously imparted to said solid phase, and wherein said solid phase is thawed to effect separation of the rubber content thereof.

3. The process of claim 1 carried out continuously and wherein substantially equal proportions by weight of said unfrozen and frozen synthetic rubber latex are introduced to said mixing zone and wherein substantially equal proportions by weight of said solid and liquid phases are present in and removed from said resulting mixture.

4. The process of coagulating a synthetic rubber emulsion produced by the aqueous emulsion polymerization of an aliphatic conjugated diolefin, which comprises freezing one portion of said emulsion, admixing the resulting frozen emulsion with another portion of said emulsion in unfrozen condition in such proportions that the unfrozen emulsion is cooled without substantial thawing of the frozen emulsion, separating the frozen emulsion from the unfrozen emulsion, freezing the unfrozen emulsion, thawing the frozen emulsion, and separating coagulated synthetic rubber therefrom.

5. A process according to claim 4 wherein the synthetic rubber emulsion is produced by the emulsion polymerization of an aliphatic conjugated diolefin and an unsaturated material copolymerizable therewith.

6. A process according to claim 4 wherein the synthetic rubber emulsion is produced by the emulsion polymerization of a conjugated diolefin and an unsaturated material copolymerizable therewith containing a vinyl group.

7. A process according to claim 4 wherein the synthetic rubber emulsion is produced by the emulsion polymerization of butadiene and styrene.

8. The process of coagulating a synthetic rubber emulsion produced by the aqueous emulsion polymerization of a conjugated diolefin which comprises freezing a portion of said emulsion in a freezing zone, admixing the resultant frozen emulsion with a portion of said emulsion in unfrozen condition in a mixing zone, allowing the establishment of thermal equilibrium in the resulting mixture, so adjusting the temperature and relative proportions of the frozen and unfrozen emulsion so admixed that said resulting mixture is substantially at the freezing point and contains substantial proportions of both solid and liquid phases, separating the solid phase from the liquid phase, and freezing the liquid phase in said freezing step.

9. The process of coagulating a synthetic rubber emulsion produced by the aqueous emulsion polymerization of a conjugated diolefin which comprises intimately comingling a portion of said emulsion and a liquefied normally gaseous refrigerant in a freezing zone and effecting freezing of said emulsion by evaporation of said refrigerant, intimately admixing the resultant frozen emulsion with a portion of said emulsion in unfrozen condition in a mixing zone, allowing the establishment of thermal equilibrium in the resulting mixture, so adjusting the temperature and relative proportions of the frozen and unfrozen emulsion so admixed that the resulting mixture is substantially at the freezing point and contains substantial proportions of both solid and liquid phases, separating the solid phase from the liquid phase, freezing the liquid phase in said freezing step, and thawing said solid phase to effect separation of the rubber contained therein.

I. LOUIS WOLK.
JOHN D. UPHAM.